(12) United States Patent
Reistrup (10) Patent No.: US 12,118,969 B2
(45) Date of Patent: Oct. 15, 2024

(54) WIRELESSLY COUPLED MUSICAL EFFECT PEDALS

(71) Applicant: Jando LLC, Austin, TX (US)

(72) Inventor: Olaf Reistrup, Austin, TX (US)

(73) Assignee: JANDO LLC, Austin, TX (US)

( * ) Notice: Subject to any disclaimer, the term of this patent is extended or adjusted under 35 U.S.C. 154(b) by 359 days.

(21) Appl. No.: 17/207,572

(22) Filed: Mar. 19, 2021

(65) Prior Publication Data
US 2021/0295809 A1   Sep. 23, 2021

Related U.S. Application Data

(60) Provisional application No. 62/992,023, filed on Mar. 19, 2020.

(51) Int. Cl.
| | |
|---|---|
| H02J 50/00 | (2016.01) |
| G10H 1/00 | (2006.01) |
| G10H 1/34 | (2006.01) |
| H02J 7/02 | (2016.01) |
| H02J 50/12 | (2016.01) |
| H02J 50/40 | (2016.01) |
| H02J 50/80 | (2016.01) |

(52) U.S. Cl.
CPC ........... *G10H 1/348* (2013.01); *G10H 1/0008* (2013.01); *H02J 7/02* (2013.01); *H02J 50/12* (2016.02); *H02J 50/402* (2020.01); *H02J 50/80* (2016.02); *G10H 2240/211* (2013.01)

(58) Field of Classification Search
CPC .................................. H02J 50/00; H04B 5/00
See application file for complete search history.

(56) References Cited

U.S. PATENT DOCUMENTS

| | | | |
|---|---|---|---|
| 7,754,956 B2 * | 7/2010 | Gain ..................... | G10H 1/0091 |
| | | | 84/615 |
| 9,728,172 B1 * | 8/2017 | Perez ...................... | G10H 1/18 |
| 10,395,631 B1 | 8/2019 | Boxberger | |
| 10,541,563 B2 * | 1/2020 | Jung ..................... | H04B 5/0037 |
| 10,657,940 B1 * | 5/2020 | Calder ................ | G10H 1/0008 |
| 10,984,772 B2 * | 4/2021 | Robertson .............. | G06F 9/325 |
| 2009/0096413 A1 * | 4/2009 | Partovi ................... | H01F 27/36 |
| | | | 320/108 |
| 2013/0293025 A1 * | 11/2013 | Xu ......................... | H02J 50/12 |
| | | | 307/104 |
| 2014/0126609 A1 * | 5/2014 | Vumbaco ............... | G10H 1/348 |
| | | | 375/130 |
| 2016/0322851 A1 * | 11/2016 | Yeh ...................... | H04B 5/0075 |
| 2017/0288444 A1 * | 10/2017 | Komulainen ......... | H02J 50/40 |
| 2018/0090115 A1 * | 3/2018 | Skillings ............... | H02J 7/0042 |
| 2018/0159371 A1 * | 6/2018 | Kim ........................ | H02J 50/10 |

(Continued)

OTHER PUBLICATIONS

Trevor Curwen, "Hotone Xtomp Review", Sep. 12, 2016, Music Radar website (Year: 2016).*
Chain Definition & Meaning—Merriam-Webster.*

*Primary Examiner* — Adi Amrany
(74) *Attorney, Agent, or Firm* — Gallium Law; Wesley Schwie (57) ABSTRACT

A system and apparatus are disclosed for coupling effect pedals used by musicians and other audio performance artists to a signal processing chain and to a power source. Power is provided to effect pedals wirelessly by inductive coupling, and effect pedals may be coupled to a signal processing chain through cables or wirelessly.

20 Claims, 4 Drawing Sheets

(56) References Cited

U.S. PATENT DOCUMENTS

| | | | |
|---|---|---|---|
| 2019/0097448 A1* | 3/2019 | Partovi | H01F 38/14 |
| 2020/0038158 A1* | 2/2020 | Gagliano | A61M 37/0084 |
| 2020/0202828 A1* | 6/2020 | Scherbacovsky | G10H 1/0091 |
| 2020/0227951 A1* | 7/2020 | Park | H02J 50/402 |
| 2021/0028655 A1* | 1/2021 | Goodchild | H02J 50/80 |

* cited by examiner

WIRELESSLY COUPLED MUSICAL EFFECT PEDALS

CROSS-REFERENCE TO RELATED APPLICATIONS

The present application claims the benefit of the filing date of U.S. Provisional Patent Application No. 62/992,023, filed Mar. 19, 2020, the contents of which are hereby incorporated by reference.

BACKGROUND OF THE INVENTION

1. Field

The present invention relates generally to a system comprised of a pedal board and one or more effect pedals that are wirelessly coupled to power and signal paths for musicians and audio performance artists.

2. Description of the Related Art

Effect pedals or "stompboxes" are used by musicians and other audio performance artists to selectively introduce audio effects, such as overdrive, reverb, delay and distortion to the audio signal produced by musical instruments, such as keyboards, electric guitars and electric basses. Effect pedals can also be used to modify vocal signals or to recorded music or other sounds. These effect pedals are commonly placed on a pedal board and coupled in a particular signal chain (or effect chain) sequence through audio patch cables with standard ¼ inch 2-conductor phone plugs between each effect pedal for processing the analog audio signal. Such pedal boards are usually placed on the floor and each effect pedal actuated by the artist's foot to selectively introduce specific audio effects. Each effect pedal also requires a source of electrical power. A pedal board and its collection of effect pedals placed thereon thus require many cables and wires to connect the effect pedals to electrical power and the signal chain. A musician may desire to change the configuration of the effect pedals to physically move the effect pedal to a different physical location on the pedal board, and/or to change the order of the signal processing performed by the effect pedals.

Musicians are able to craft a unique sound, timbre or tone by using one or more effect pedals. Music effect pedals modify the input of an analog audio signal by introducing waveform shaping electrical changes to the input signal. The resulting signal can be pitch-shifted, delayed, equalized to bring out certain frequencies, or modulated to create a chorus, flange or phasing tone. Effects can also be time-based to produce echo, delay and reverb. Popular effect pedals include distortion, overdrive, wah-wah, fuzz, delay, flanger, phaser, reverb, chorus, compression, looping and boost. The order in which these pedals are placed in the signal chain also affects the sound. Compression, overdrive and wah-wah pedals are typically at the start of the signal chain, modulation pedals such as phaser, flanger and chorus in the middle of the signal chain, and time-based pedals such as delay, echo, and reverb at the end of the signal chain. Additional pedals to reduce or suppress noise or hum may be placed at the beginning and/or and of the signal chain.

Presently, reconfiguring a pedal board entails moving the effect pedal to a different location on the pedal board and reconfiguring the power and/or signal cables to the effect pedals. This process is time-consuming and cumbersome.

An effect pedal is typically powered by a small power supply that converts 110 VAC or similar wall AC power to DC power between 6 to 24 volts, which is provided to the effect pedal by a cable. Most effect pedals are powered by a 9 VDC corded power supply. Some effect pedals are powered by a 9 V battery instead of a power supply. In some cases, additional musical effects can be obtained by intentionally reducing the voltage and/or current provided to an effect pedal below what is normally required.

In the last decade, wireless charging has become prevalent for small consumer devices such as smartphones and smart watches. For example, the Qi wireless charging standard has become widely supported to charge Apple and Samsung portable electronic devices. Wireless charging systems typically rely on inductive charging over short distances, on the order of a few millimeters to less than 50 millimeters between the wireless charger and the charged device. The wireless charger has a charging pad with one or more planar charging coils that charge the device by resonant inductive coupling with one or more planar coils in or on the device to be charged. The primary benefit of wireless charging is that cables and wires to supply power are avoided.

It is also possible to transmit and receive signals wirelessly, and to route signals within one or more integrated circuits such as processors, microcontrollers, digital signal processors (DSPs) and application-specific integrated circuits (ASICs).

SUMMARY OF THE INVENTION

The following is a non-exhaustive listing of some aspects of the present techniques for wirelessly coupling signal connections and power to effect pedals on a pedal board. These and other aspects are described in the following disclosure.

It is apparent that a need exists for wirelessly coupling signal connections and power to effect pedals on a pedal board. In particular, there is a need to provide wireless signal connections and power to all models of effect pedals, especially classic effect pedals that were created decades ago but are still widely used by musicians. The embodiments disclosed herein provide musicians and artists a flexible way to configure and reconfigure pedal boards without repatching signal and power connections.

In other embodiments, the effect pedal audio signal input and output connections are also coupled to the pedal board of the invention. In one aspect, the signal connections to each effect pedal are made by audio patch cables that are part of the pedal board. In another aspect, the signal connections to each effect pedal are made wirelessly to the pedal board. In certain embodiments, the pedal board contains an analog audio signal processor that provides the signal chain between the various effect pedals.

Some aspects include a method for configuring the signal chain of two or more effect pedals performed by devices with processing capability, that is, any device that contains a CPU, microprocessor, microcontroller, field-programmable gate array (FPGA), application-specific integrated circuit (ASIC) or other integrated circuit able to execute instructions implementing the invention. As non-limiting examples, such devices include computing devices, such as a desktop computer, notebook computer, server, tablet, phone, smartphone, personal digital assistant (PDA), and other mobile device.

These and other advantages of the invention disclosed herein will be apparent to those of ordinary skill in the art by reference to the following detailed description and the accompanying drawings.

BRIEF DESCRIPTION OF THE DRAWINGS

The above-mentioned aspects and other aspects of the present techniques will be better understood when the present application is read in view of the following figures in which like numbers indicate similar or identical elements.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventor had to both invent solutions and, in some cases just as importantly, recognize problems overlooked (or not yet foreseen) by others in the fields of wireless communication and wireless charging. Indeed, the inventor wishes to emphasize the difficulty of recognizing those problems that are nascent and will become much more apparent in the future should trends in industry continue as the inventor expects. Further, because multiple problems are addressed, it should be understood that some embodiments are problem-specific, and not all embodiments address every problem with traditional systems described herein or provide every benefit described herein. That said, improvements that solve various permutations of these problems are described below.

The present invention solves a long-standing challenge in integrating effect pedals into a pedal board by providing the power and signal connections to each effect pedal as part of the pedal board itself.

In one embodiment of the invention, each effect pedal is powered wirelessly by inductive coupling between a wireless charging transmitter as part of the pedal board and a wireless charging receiver as part of each effect pedal. Various embodiments are contemplated for the wireless charging transmitters that are part of the pedal board. In a preferred embodiment, the pedal board has multiple wireless charging transmitter coils and associated circuitry integrated into the board such that each effect pedal position on the pedal board has its own wireless charging transmitter. In an alternative embodiment, a separate planar wireless charging transmitter board is attached to the pedal board at each effect pedal position on the pedal board. In another embodiment, the wireless charging receiver is integrated into the enclosure of the effect pedal by incorporating one or more receiver coils and associated circuitry to provide DC power to the effect pedal. In other embodiments, the wireless charging receiver is implemented in a separate planar board to which the effect pedal is mounted, which contains one or more receiver coils and associated circuitry to provide DC power to the effect pedal with a short cable that plugs into the power input of the effect pedal. In yet another embodiment, a battery-powered effect pedal is adapted for wireless charging by incorporating either an integrated wireless charging subsystem or a wireless charging subsystem on a planar board to which the effect pedal is attached. Furthermore, in certain embodiments of the invention, a wireless charging subsystem can be independently controlled to provide less voltage and/or current to the respective effect pedal than the rated power requirements in order to obtain further audio signal effects by "starving" the effect pedal.

Figure 1:
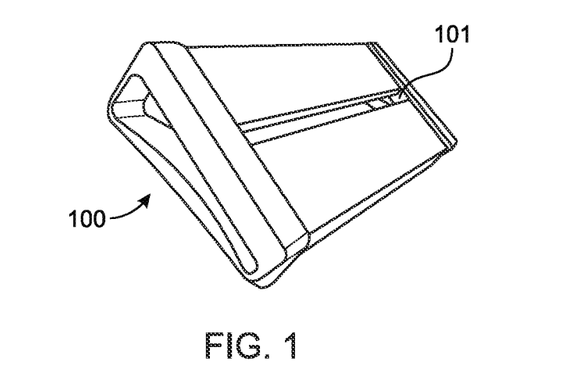
FIG. 1 is a perspective view of an exemplary pedal board of the invention.

FIG. 1 is a perspective view of an exemplary pedal board 100 of the invention. Pedal board 100 can be constructed of any material, such as wood, plastic or a lightweight metal like aluminum, that can withstand the stress of a musician pressing a foot on the effect pedals thereon. Pedal board 100 is shown with a channel 101 disposed horizontally in the center of the top surface, but this is merely exemplary and not limiting. Pedal board 100 may be sized to accommodate one or more rows of effect pedals, preferably two or three, and several effect pedals on each row, with preferably five or six pedals per row. All sizes and shapes of pedal board 100 should be considered within the scope of the invention. In certain embodiments, pedal board 100 is comprised of one or more conductive layers, with patterned conductive traces on each layer in similar fashion to a printed circuit board. The one or more conductive layers provide signal and power connections to the effect pedals mounted on the pedal board, as discussed in further detail hereinbelow.

Figure 2:
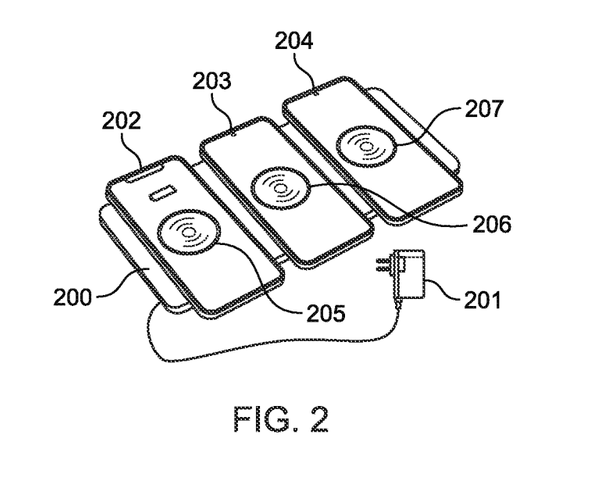
FIG. 2 is a perspective view of a modular pedal board with several wireless charging transmitters.

FIG. 2 is a perspective view of an exemplary pedal board module 200 with three wireless charging transmitters arranged thereon. In this embodiment, one or more pedal board modules 200 can be attached to pedal board 100 in FIG. 1, or pedal board module 200 can be directly utilized as a small pedal board. As depicted in FIG. 2, pedal board module 200 is powered by AC power supply 201, which provides AC or DC power to wireless charging transmitters 202, 203 and 204. In an alternative embodiment, each pedal board module 200 receives power directly from pedal board 100 through one or more wires, cables or electrical contacts. Each of wireless charging transmitters 202, 203 and 204 has a wireless charging coil 205, 206 and 207, respectively, for inductively coupling to corresponding wireless charging receivers as part of each effect pedal, as described in further detail below. Although wireless charging transmitters 202, 203 and 204 are shown as having a single wireless charging coil 205, 206 and 207, respectively, each wireless charging transmitter may have multiple wireless charging coils according to the power requirements of the respective effect pedal powered thereby.

Figure 3A:
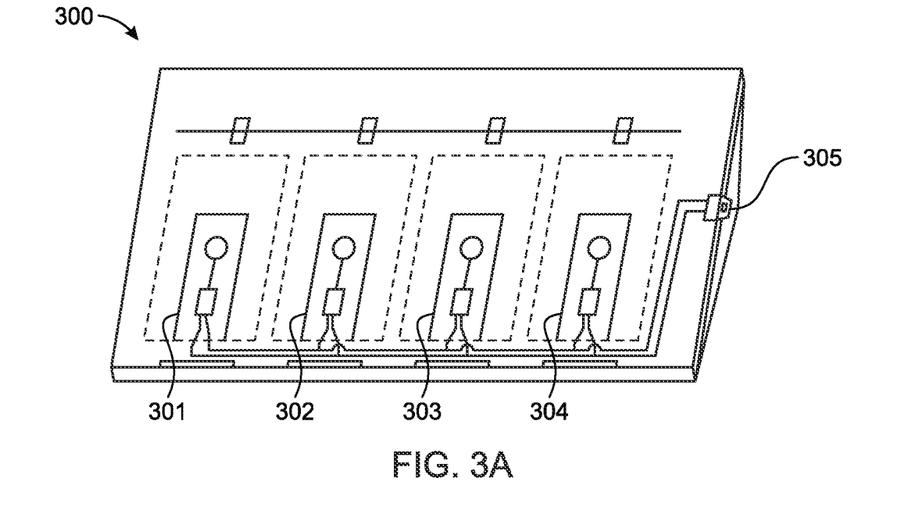
FIG. 3A depicts an embodiment of the pedal board of the invention with multiple integrated wireless charging transmitters.

FIG. 3A shows an embodiment of the invention in which pedal board 300 contains integrated wireless charging transmitters 301, 302, 303 and 304, each of which powers a respective effect pedal mounted thereon (not shown for clarity). The dotted line around each of wireless charging transmitters 301, 302, 303 and 304 identifies the approximate area on pedal board 300 for each effect pedal powered by the respective wireless charging transmitters. Pedal board 300 includes two conductors coupled to each of wireless charging transmitters 301, 302, 303 and 304 to supply AC or DC power from power source terminals 305. Any form of these conductors are within the scope of the invention, for example, wires, cables, and conductive traces on or within pedal board 300.

Figure 3B:
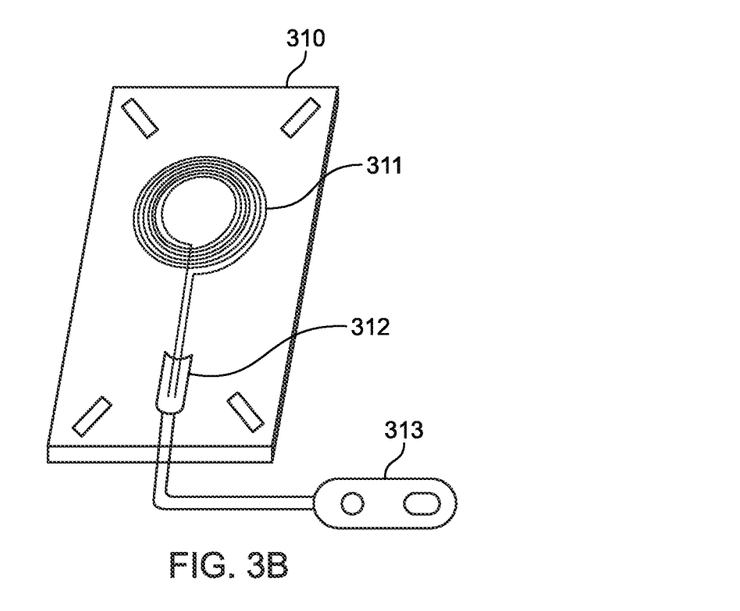
FIG. 3B depicts an integrated wireless charging transmitter used in certain embodiments of the invention.

FIG. 3B shows an embodiment of a wireless charging transmitter of the pedal board 300 shown in FIG. 3A. Each wireless charging transmitter 310 includes one or more wireless charging coils 311 to inductively couple to one or more wireless charging coils in the corresponding wireless charging receiver for each effect pedal. Although wireless charging transmitter 310 is shown with a single wireless charging coil 311, each wireless charging transmitter may have multiple wireless charging coils according to the power requirements of the respective effect pedal powered thereby. Wireless charging coil 311 is coupled to wireless charging transmitter circuitry 312, which controls wireless charging coil 311 to provide the appropriate amount of power to the corresponding wireless charging receiver in the effect pedal. Wireless charging transmitter circuitry 312 is coupled to connector 313, which connects to the power source terminals 305 in FIG. 3A, for example.

Figure 4A:
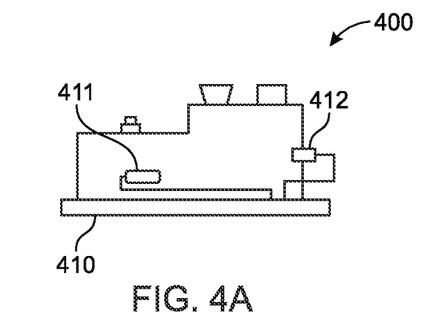
FIG. 4A depicts an exemplary effect pedal mounted on a wireless charging receiver board.

FIG. 4A is a profile view of an exemplary effect pedal 400 mounted on an effect pedal sub-board 410 in accordance with an embodiment of the invention. Effect pedal sub-board 410 includes a wireless charging receiver (not shown) to receive power wirelessly from a wireless charging transmitter in the pedal board. The power output from the wireless charging receiver of effect pedal sub-board 410 is coupled to effect pedal 400 by way of cable 412. The signal input and output jacks (or other connectors) of effect pedal 400 are also coupled to effect pedal sub-board 410 with wires, cable, or other conductors. For example, FIG. 4A shows a two-conductor shielded cable coupling signal output 411 to effect pedal sub-board 410. Although not shown in FIG. 4A, in one embodiment effect pedal sub-board 410 makes two or more electrical contacts with the pedal board upon which it is mounted to couple the effect pedal signal input and outputs to the pedal board. In another embodiment, signal connections can be made between effect pedals with short audio patch cables as known in the art.

Figure 4B:
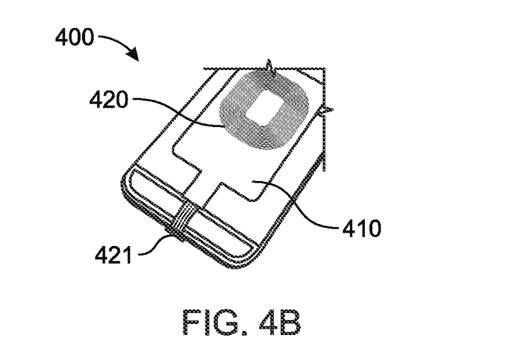
FIG. 4B depicts an exemplary wireless charging receiver board of the invention.

FIG. 4B shows the underside of the effect pedal sub-board 410, which is attached to exemplary effect pedal 400. Effect pedal sub-board 410 has a wireless receiver coil 420, which receives power from the corresponding wireless charging transmitter by inductive coupling. Although effect pedal sub-board 410 is shown with a single wireless receiver coil 420, those of skill in the art will readily recognize that multiple wireless receiver coils can be used instead in order to provide the appropriate amount of power to the effect pedal powered thereby. The effect pedal is powered by electrical connector 421, which receives power from the wireless charging receiver circuitry (not depicted).

Figure 4C:
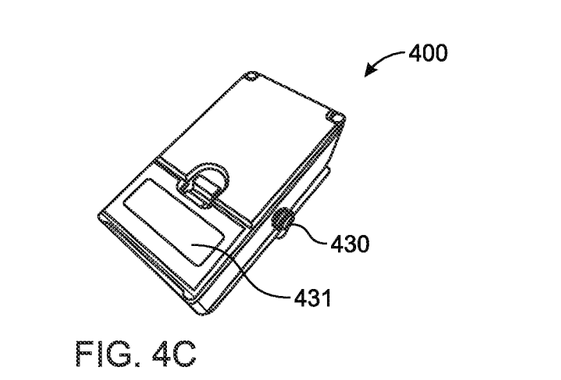
FIG. 4C is a perspective view of an exemplary effect pedal mounted on a wireless charging receiver board.

FIG. 4C shows the underside of an exemplary effect pedal 400 with an analog audio signal input jack 430 and a battery compartment cover 431. In an embodiment of the invention, an effect pedal sub-board is attached to a battery-powered effect pedal such that the wireless charging receiver in the sub-board powers the effect pedal in place of the internal battery.

Figure 5:
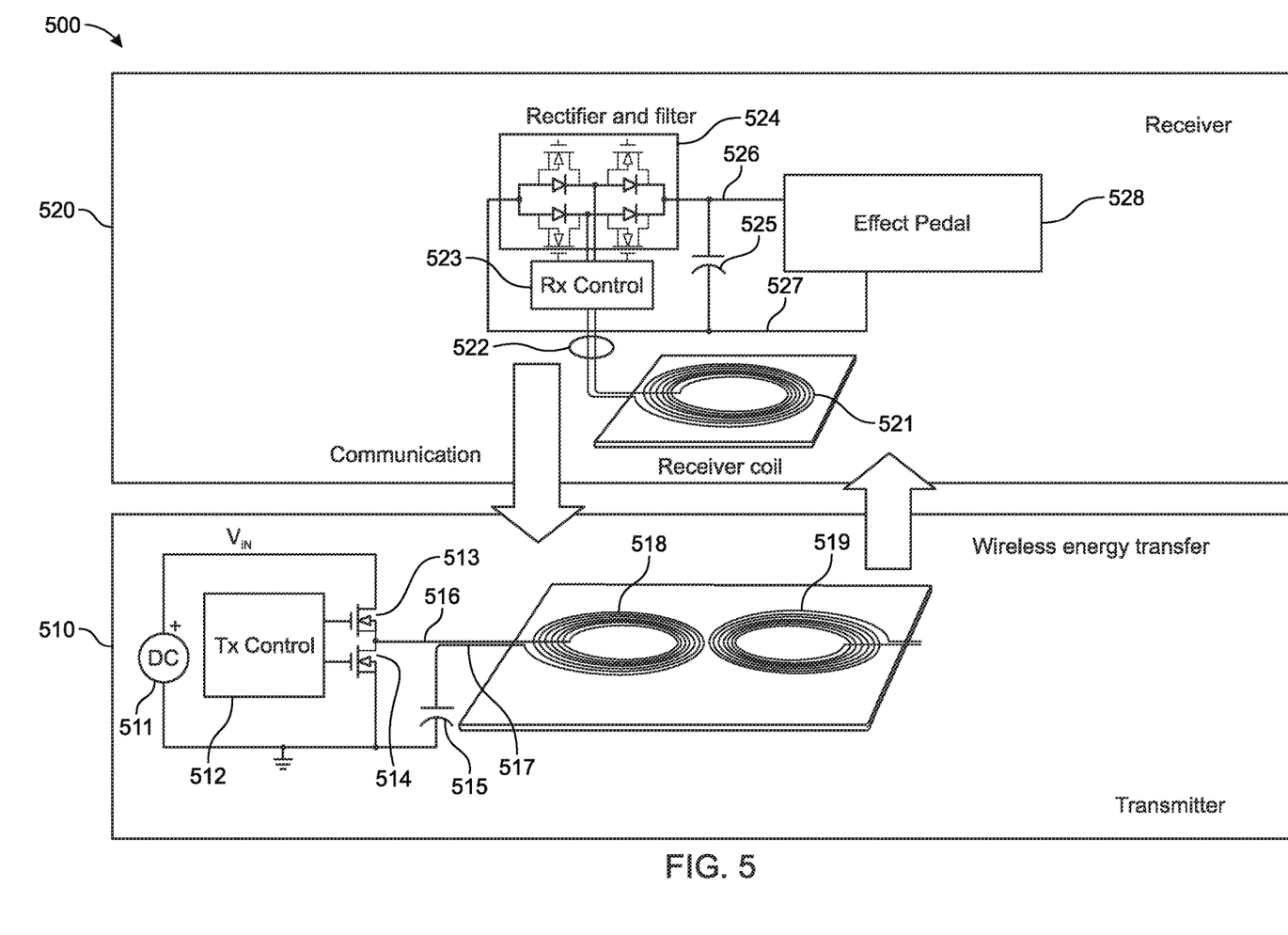
FIG. 5 depicts a schematic diagram of one embodiment of the wireless charging subsystem, with a wireless charging transmitter and a wireless charging receiver.

FIG. 5 is a schematic diagram of one embodiment of the wireless charging subsystem 500 of the invention. It is exemplary only and not intended to limit the invention to the circuitry shown. Wireless charging transmitter 510 is comprised of a DC power source 511 with positive voltage supply VIN and ground, which are connected to MOSFETs 513 and 514 to form a half bridge inverter, controlled by transmitter control circuit 512. Transmitter control circuit 512 selectively turns on MOSFETs 513 and 514 alternately to create a square wave output on conductors 516 and 517, as smoothed by capacitor 515. Thus, conductors 516 and 517 provide an AC power signal to wireless transmitting coils 518 and 519 at an appropriate frequency to establish resonant inductive coupling with the wireless charging receiver 520 associated with an effect pedal. Although two wireless transmitter coils 518 and 519 are depicted in FIG. 5, wireless charging transmitter 510 may contain only one wireless transmitter coil or more than two wireless transmitter coils and remain within the scope of the invention. Wireless charging receiver 520 is comprised of wireless receiver coil 521, which is in resonant inductive coupling with one or more wireless transmitting coils in wireless charging transmitter 510 to output an AC power signal 522 to receiver control circuit 523. Receiver control circuit 523 outputs an AC power signal to full wave rectifier and filter 524, which produces a filtered DC power signal on power output conductors 526 and 527, smoothed by capacitor 525. The filtered DC power signal on conductors 526 and 527 is provided to the effect pedal 528 for DC power. In some embodiments, the wireless charging receiver communicates wirelessly with the wireless charging transmitter to send feedback such as an overload or other condition of the wireless charging receiver.

Figure 6:
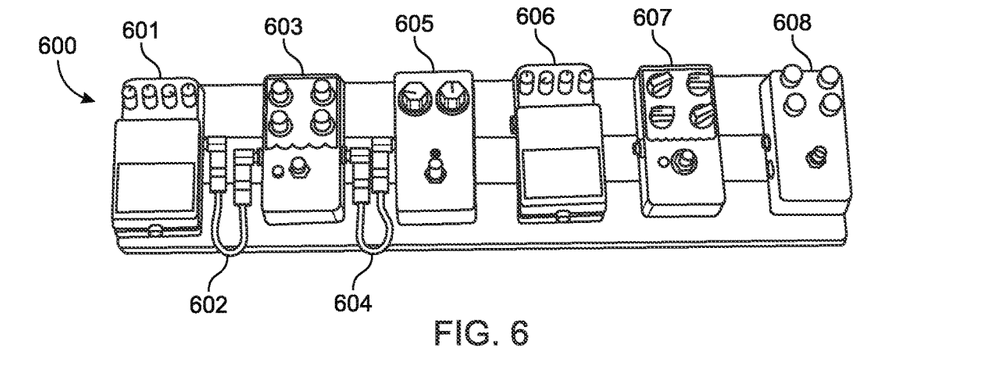
FIG. 6 depicts an embodiment of the invention in which multiple effect pedals are powered wirelessly.

FIG. 6 shows an exemplary embodiment of the invention comprised of pedal board 600 and six effect pedals 601, 603, 605, 606, 607 and 608 mounted thereon. In the embodiment shown, each effect pedal is powered wirelessly by a respective wireless charging subsystem 500. In this embodiment, several signal connections between effect pedals are shown using short audio patch cables, for example patch cable 602 couples the analog audio signal output of effect pedal 601 to the analog audio signal input of effect pedal 603, and patch cable 604 couples the analog audio signal output of effect pedal 603 to the analog audio signal input of effect pedal 605. Although in certain embodiments the invention features an analog audio signal processor to couple the respective analog audio inputs and outputs from the effect pedals to create a configurable audio signal chain, those of skill in the art will appreciate that it is nonetheless possible to use audio patch cables between certain effect pedals.

Figure 7A:
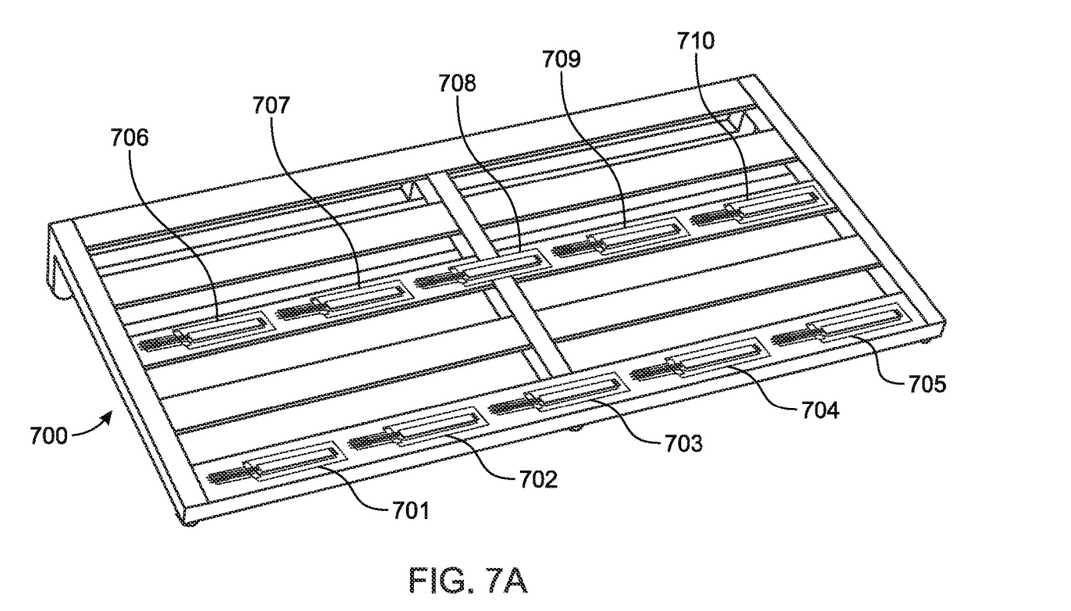
FIG. 7A depicts an exemplary pedal board in which each effect pedal position has a controller to set the power available to the respective effect pedal.
Figure 7B:
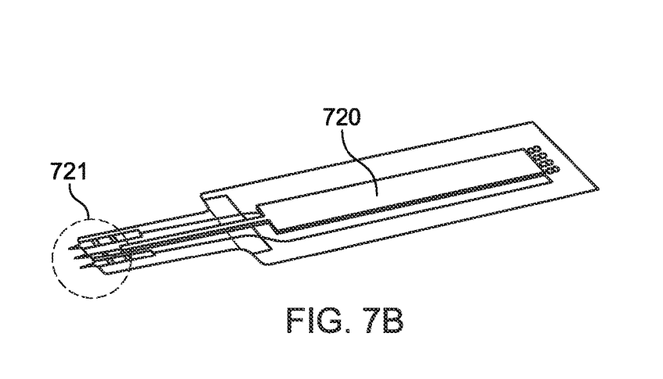
FIG. 7B depicts a detailed view of the power controller for an effect pedal in accordance with an embodiment of the invention.

FIG. 7A illustrates an alternative embodiment of pedal board 700, in which each of ten effect pedal locations has an associated power controller 701, 702, 703, 704, 705, 76, 707, 708, 709 and 710. FIG. 7B shows further detail of power controller 720, which in one form is a membrane potentiometer that acts as a sealed resistive element that can be pressed by a finger to adjust the amount of power (voltage and/or current) delivered to the associated effect pedal. One example of a suitable membrane potentiometer is the SpectraSymbol ThinPot potentiometer, but any suitable controller is within the scope of the invention. Power controller 720 is coupled to the wireless charging transmitter control circuit through terminals 721.

In certain embodiments, the effect pedal audio signal input and output connections are also coupled to the pedal board of the invention. In one embodiment, the pedal board has two short patch cables, each with a standard ¼ inch 2-conductor audio phone plug, at each effect pedal position, which connect to the signal input and output jacks, respectively, of each effect pedal. These patch cables for each effect pedal connect to an analog audio signal processor that can place each effect pedal at a desired location in the signal chain with respect to the other effect pedals, or exclude an effect pedal from the signal chain if desired. In an alternative embodiment, the effect pedal sub-board makes electrical contact for the effect pedal audio input and output signals directly to corresponding contacts or terminals on the pedal board, which are in turn connected to the analog audio signal processor. In another embodiment, each effect pedal input and output jack connects wirelessly to the analog audio signal processor by way of wireless transceivers that are inserted into the standard ¼ inch audio phone jacks in the effect pedal. These transceivers receive power from the wireless charging receiver of the effect pedal. In one such embodiment, the wireless transceivers utilize the Bluetooth wireless communication standard to communicate with the analog audio signal processor, but other wireless communication standards and protocols are contemplated for use with the invention. Routing the analog signals to and from each effect pedal through the analog audio signal processor obviates the need for patch cables between each effect pedal in the signal chain and facilitates rapid reconfiguration of the signal chain without disturbing any connections to the effect pedals.

In one embodiment, the analog audio signal processor is externally controllable to select the sequential position of each effect pedal in the analog signal chain, for example, by way of mechanical, electromechanical, or electrical controls. In yet another embodiment, the analog audio signal processor is remotely controllable by a mobile device, desktop computer, or notebook computer, by way of a cable, such as a USB cable, between the controlling device and the analog audio signal processor. In a related embodiment, the analog audio signal processor is wirelessly controllable by a known wireless protocol such as Bluetooth® or IEEE 802.11 Wi-Fi. Other wired and wireless connections to control the analog audio signal processor are within the scope of the invention.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several inventions. Rather than separating those inventions into multiple isolated patent applications, applicant has grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to cost constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

What is claimed is:

1. A pedal board for musical effect pedals, comprising:
   a pedal board base for mounting a plurality of musical effect pedals, each of said plurality of musical effect pedals having a wireless charging receiver circuit;
   a plurality of wireless charging transmitter circuits integrated in said pedal board base, each of said wireless charging transmitter circuits for powering a distinct one of said plurality of musical effect pedals wirelessly by resonant inductive coupling, wherein the location of each of said wireless charging transmitter circuits is coincident with the mounting location of the respective one of said plurality of musical effect pedals, and wherein each of said wireless charging transmitter circuits is operable to select the voltage and/or current delivered by the wireless charging receiver circuit in the respective one of said plurality of musical effect pedals; and
   an analog audio signal processor for coupling to the respective analog audio signal input and analog audio signal output of each of the plurality of musical effect pedals, wherein the analog signal processor is operable to change the sequential position of each of said plurality of musical effect pedals in an analog audio signal processing chain.

2. The pedal board of claim 1, wherein at least one of said plurality of wireless charging transmitter circuits is configured to couple to a wireless charging receiver circuit in a musical effect pedal using the Qi wireless power transfer standard.

3. The pedal board of claim 2, wherein said plurality of wireless charging transmitter circuits are configured to couple to said plurality of wireless charging receiver circuits in said plurality of musical effect pedals using the Qi wireless power transfer standard.

4. The pedal board of claim 1, wherein at least one of said plurality of wireless charging transmitter circuits is operable to select the voltage provided by said wireless charging receiver circuit to be lower than the rated voltage for the musical effect pedal powered by the wireless charging receiver circuit.

5. The pedal board of claim 1, wherein at least one of said plurality of wireless charging transmitter circuits is operable to select the current provided by said wireless charging receiver circuit to be lower than the rated current for the musical effect pedal powered by the wireless charging receiver circuit.

6. The pedal board of claim 1, wherein said analog audio signal processor is configured to couple to the respective analog audio signal input and analog audio signal output of each of the plurality of musical effect pedals with a plurality of conductors.

7. The pedal board of claim 1, wherein said analog audio signal processor is configured to couple to the respective analog audio signal input and analog audio signal output of each of the plurality of musical effect pedals wirelessly.

8. A system for processing an analog audio signal, comprising:
   a pedal board base;
   a plurality of musical effect pedals mounted on said pedal board base, each of said plurality of musical effect pedals having a wireless charging receiver circuit;
   a plurality of wireless charging transmitter circuits integrated in said pedal board base, each of said plurality of wireless charging transmitter circuits for powering a distinct one of said plurality of musical effect pedals wirelessly by resonant inductive coupling, wherein the location of each of said wireless charging transmitter circuits is coincident with the mounting location of the respective one of said plurality of musical effect pedals, and wherein each of said wireless charging transmitter circuits is operable to select the voltage and/or current delivered by the wireless charging receiver circuit in the respective one of said plurality of musical effect pedals; and
   an analog audio signal processor for coupling to the respective analog audio signal input and analog audio signal output of each of the plurality of musical effect pedals, wherein the analog signal processor is operable to change the sequential position of each of said plurality of musical effect pedals in an analog audio signal processing chain.

9. The system of claim 8, wherein at least one of said plurality of wireless charging transmitter circuits is configured to couple to a respective wireless charging receiver circuit in at least one of said plurality of musical effect pedals using the Qi wireless power transfer standard.

10. The system of claim 9, wherein said plurality of wireless charging transmitter circuits are configured to couple to the plurality of wireless charging receiver circuits in said plurality of musical effect pedals using the Qi wireless power transfer standard.

11. The system of claim 8, wherein said at least one of said plurality of wireless charging transmitter circuits is operable to select the voltage and/or current provided by said wireless charging receiver circuit to be lower than the rated voltage and/or current for the musical effect pedal powered by the wireless charging receiver circuit.

12. The system of claim 11, wherein said analog audio signal processor is configured to couple to the respective analog audio signal input and analog audio signal output of each of the plurality of musical effect pedals wirelessly.

13. The system of claim 12, wherein said analog audio signal processor is operable to be controlled remotely by one or more of a mobile device, desktop computer, or notebook computer.

14. A pedal board for musical effect pedals, comprising:
a pedal board base for mounting a plurality of musical effect pedals, each of said plurality of musical effect pedals having a wireless charging receiver circuit and a wireless audio signal transceiver;
a plurality of wireless charging transmitter circuits integrated in said pedal board base, each of said wireless charging transmitter circuits for powering a distinct one of said plurality of musical effect pedals wirelessly by resonant inductive coupling, wherein the location of each of said wireless charging transmitter circuits is coincident with the mounting location of the respective one of said plurality of musical effect pedals, and wherein each of said wireless charging transmitter circuits is operable to select the voltage and/or current delivered by the wireless charging receiver circuit in the respective one of said plurality of musical effect pedals;
a plurality of wireless audio signal transceiver circuits integrated in said pedal board base, each of said plurality of wireless audio signal transceiver circuits configured to couple to the respective wireless audio signal transceiver of a distinct one of the plurality of musical effect pedals; and
an audio signal processor for coupling to the respective audio signal input and audio signal output of each of the plurality of musical effect pedals, wherein the signal processor is operable to change the sequential position of each of said plurality of musical effect pedals in an audio signal processing chain.

15. The pedal board of claim 14, wherein at least one of said plurality of wireless charging transmitter circuits is configured to couple to a wireless charging receiver circuit in a musical effect pedal using the Qi wireless power transfer standard.

16. The pedal board of claim 15, wherein said plurality of wireless charging transmitter circuits are configured to couple to said plurality of wireless charging receiver circuits in said plurality of musical effect pedals using the Qi wireless power transfer standard.

17. The pedal board of claim 14, wherein at least one of said plurality of wireless charging transmitter circuits is operable to select the voltage provided by said wireless charging receiver circuit to be lower than the rated voltage for the musical effect pedal powered by the wireless charging receiver circuit.

18. The pedal board of claim 14, wherein at least one of said plurality of wireless charging transmitter circuits is operable to select the current provided by said wireless charging receiver circuit to be lower than the rated current for the musical effect pedal powered by the wireless charging receiver circuit.

19. The pedal board of claim 14, wherein at least one of said plurality of integrated wireless audio signal transceiver circuits communicates using the Bluetooth standard.

20. The pedal board of claim 14, wherein said audio signal processor is operable to be controlled remotely by one or more of a mobile device, desktop computer, or notebook computer.

\* \* \* \* \*